United States Patent
Sakarda et al.

(10) Patent No.: US 9,442,758 B1
(45) Date of Patent: Sep. 13, 2016

(54) DYNAMIC PROCESSOR CORE SWITCHING

(75) Inventors: Premanand Sakarda, Acton, MA (US); Scott B. Peirce, Forestdale, MA (US); Jia Bao, Shanghai (CN); Marlon Moncrieffe, Leominster, MA (US); Priya Vaidya, Shrewsbury, MA (US); Michael D Rosenzweig, Hopkinton, MA (US); Minda Zhang, Westford, MA (US); Palanisamy Mohanraj, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 747 days.

(21) Appl. No.: 12/356,761

(22) Filed: Jan. 21, 2009

Related U.S. Application Data (60) Provisional application No. 61/022,435, filed on Jan. 21, 2008.

(51) Int. Cl.
*G06F 9/40* (2006.01)
*G06F 9/48* (2006.01)
*G06F 9/50* (2006.01)

(52) U.S. Cl.
CPC ........... *G06F 9/4856* (2013.01); *G06F 9/5088* (2013.01)

(58) Field of Classification Search
None
See application file for complete search history.

(56) References Cited

U.S. PATENT DOCUMENTS

| | | | |
|---|---|---|---|
| 4,754,216 A | 6/1988 | Wong | |
| 4,810,975 A | 3/1989 | Dias | |
| 5,450,360 A | 9/1995 | Sato | |
| 5,535,397 A | 7/1996 | Durante et al. | |
| 5,649,135 A | 7/1997 | Pechanek et al. | |
| 5,724,427 A | 3/1998 | Reeds, III | |
| 5,768,500 A | 6/1998 | Agrawal et al. | |
| 5,778,070 A | 7/1998 | Mattison | |
| 5,933,627 A | 8/1999 | Parady | |
| 5,943,493 A | 8/1999 | Teich et al. | |
| 5,961,577 A | 10/1999 | Soenen et al. | |
| 6,018,759 A | 1/2000 | Doing et al. | |
| 6,151,668 A | 11/2000 | Pechanek et al. | |
| 6,154,544 A | 11/2000 | Farris et al. | |
| 6,446,191 B1 | 9/2002 | Pechanek et al. | |
| 6,480,136 B1 | 11/2002 | Kranz et al. | |
| 6,536,024 B1 | 3/2003 | Hathaway | |
| 6,615,355 B2 | 9/2003 | Mattison | |

(Continued)

FOREIGN PATENT DOCUMENTS

WO   WO-2013036640   3/2013

OTHER PUBLICATIONS

Kumar et al.; Single-ISA Heterogeneous Multi-Core Architectures: The Potential for Processor Power Reduction; 2003; IEEE.*

(Continued)

*Primary Examiner* — Corey S Faherty (57) ABSTRACT

Dynamic processor core switching is described. In embodiments, a multi-core processor system can include a first processor core that executes computer instructions at a first processing rate, and can include at least a second processor core that executes the computer instructions at a second processing rate, where the second processing rate is different than the first processing rate. A core profiler can generate system profile data that is evaluated to determine when a core-switch manager initiates switching execution of the computer instructions from the first processor core to the second processor core while the computer instructions are being executed.

25 Claims, 5 Drawing Sheets

(56) References Cited

U.S. PATENT DOCUMENTS

| | | |
|---|---|---|
| 7,203,821 B2 | 4/2007 | Thimmannagari |
| 7,249,246 B1 | 7/2007 | Banning et al. |
| 7,315,956 B2 | 1/2008 | Jensen et al. |
| 7,334,086 B2 | 2/2008 | Hass et al. |
| 7,401,223 B2 | 7/2008 | Walmsley |
| 7,434,053 B2 | 10/2008 | Parry et al. |
| 7,439,883 B1 | 10/2008 | Moni et al. |
| 7,598,752 B2 | 10/2009 | Li |
| 7,647,473 B2 | 1/2010 | Kamigaga et al. |
| 7,765,342 B2 | 7/2010 | Whalley et al. |
| RE41,703 E | 9/2010 | Pechanek et al. |
| 7,818,542 B2 | 10/2010 | Shen et al. |
| 8,095,775 B1 | 1/2012 | Khan |
| 8,116,457 B2 | 2/2012 | Langton |
| 8,418,006 B1 | 4/2013 | Trimberger |
| 8,610,454 B2 | 12/2013 | Plusquellic et al. |
| 8,884,920 B1 | 11/2014 | Switzer et al. |
| 9,069,553 B2 | 6/2015 | Zaarur et al. |
| 9,098,694 B1 | 8/2015 | Moss |
| 9,354,890 B1 | 5/2016 | Kang |
| 2002/0038222 A1 | 3/2002 | Naka |
| 2002/0161986 A1 | 10/2002 | Kamigata et al. |
| 2003/0001650 A1 | 1/2003 | Cao et al. |
| 2003/0061519 A1 | 3/2003 | Shibata et al. |
| 2003/0065813 A1 | 4/2003 | Ruehle |
| 2004/0003246 A1 | 1/2004 | Hopkins et al. |
| 2004/0003309 A1 | 1/2004 | Cai et al. |
| 2004/0193929 A1 | 9/2004 | Kuranuki |
| 2004/0268075 A1 | 12/2004 | Qawami et al. |
| 2005/0050542 A1 | 3/2005 | Davis et al. |
| 2006/0288244 A1 | 12/2006 | Cai et al. |
| 2007/0046511 A1 | 3/2007 | Morzano et al. |
| 2007/0136561 A1 | 6/2007 | Whalley et al. |
| 2007/0262962 A1 | 11/2007 | XiaoPing et al. |
| 2007/0283358 A1 | 12/2007 | Kasahara et al. |
| 2008/0151670 A1 | 6/2008 | Kawakubo et al. |
| 2008/0229070 A1 | 9/2008 | Charra et al. |
| 2008/0232179 A1 | 9/2008 | Kwak |
| 2008/0263324 A1 | 10/2008 | Sutardja et al. |
| 2009/0019257 A1 | 1/2009 | Shen et al. |
| 2009/0055637 A1 | 2/2009 | Holm et al. |
| 2009/0165014 A1 | 6/2009 | Park |
| 2009/0210069 A1 | 8/2009 | Schultz et al. |
| 2009/0315258 A1 | 12/2009 | Wallace et al. |
| 2009/0318229 A1 | 12/2009 | Zielinski et al. |
| 2010/0088484 A1 | 4/2010 | Roohparvar |
| 2010/0199288 A1 | 8/2010 | Kalman |
| 2010/0242014 A1 | 9/2010 | Zhu |
| 2010/0272162 A1 | 10/2010 | Simeon et al. |
| 2010/0282525 A1 | 11/2010 | Stewart |
| 2010/0309223 A1 | 12/2010 | Roth |
| 2011/0214023 A1 | 9/2011 | Barlow et al. |
| 2011/0249718 A1 | 10/2011 | Zerbe |
| 2012/0002803 A1 | 1/2012 | Adi et al. |
| 2012/0106733 A1 | 5/2012 | Falch et al. |
| 2013/0021482 A1 | 1/2013 | Silverbrook |
| 2013/0061237 A1 | 3/2013 | Zaarur |
| 2013/0182759 A1 | 7/2013 | Kim et al. |
| 2013/0311792 A1 | 11/2013 | Ponnathota et al. |
| 2014/0082630 A1 | 3/2014 | Ginzburg et al. |
| 2014/0129808 A1 | 5/2014 | Naveh et al. |

OTHER PUBLICATIONS

Kumar et al.; A Multi-Core Approach to Addressing the Energy-Complexity Problem in Microprocessors; 2003; WCED '03.*

Balakrishnan et al.; The Impact of Performance Asymmetry in Emerging Multicore Architectures; 2005; ISCA '05.*
Seznec et al.; Performance Implications of Single Thread Migration on a Chip Multi-Core; 2005; ACM SIGARCH Computer Architecture News, vol. 33, No. 4.*
"Non-Final Office Action", U.S. Appl. No. 12/254,506, (Apr. 26, 2011), 18 pages.
"Non-Final Office Action", U.S. Appl. No. 12/274,235, (Mar. 18, 2011), 11 pages.
"Final Office Action", U.S. Appl. No. 12/254,506, (Oct. 13, 2011), 26 pages.
"Notice of Allowance", U.S. Appl. No. 12/274,235, (Sep. 16, 2011), 6 pages.
"Non-Final Office Action", U.S. Appl. No. 13/477,664, Dec. 20, 2013, 9 pages.
"International Search Report and Written Opinion", Application No. PCT/US2012/053964, Dec. 14, 2012, 16 pages.
"Non-Final Office Action", U.S. Appl. No. 13/604,407, Sep. 4, 2014, 23 pages.
"Final Office Action", U.S. Appl. No. 13/013,274, Feb. 26, 2015, 20 pages.
"Notice of Allowance", U.S. Appl. No. 13/531,244, Mar. 30, 2015, 14 pages.
"Notice of Allowance", U.S. Appl. No. 13/604,407, Feb. 17, 2015, 7 pages.
Clements,"Principles of Computer Hardware", School of Computer, University of Teesside, Fourth Edition, 2006, 38 Pages.
Menezes,"Handbook of Applied Cryptography", CRC Press, Chapters 7 and 10, Oct. 1996, 104 pages.
Menezes,"Handbook of Applied Cryptography", CRC Press, ISBN: 0-8493-8523-7, Oct. 1996, 816 pages, available at <http://cacr.uwaterloo.ca/hac/>, Oct. 1996, pp. 323-325 and 388-391.
"Calling convention", Retrieved from <http://en.wikipedia.org/w/index.php?title=Calling_convention&oldid=162306164> on Apr. 15, 2014, Oct. 4, 2007, 2 pages.
"Non-Final Office Action", U.S. Appl. No. 12/254,506, Apr. 24, 2014, 18 pages.
"Notice of Allowance", U.S. Appl. No. 13/477,664, Jun. 27, 2014, 6 pages.
"X86 Disassembly/Functions and Stack Frames", Retrieved from <http://en.wikibooks.org/w/index.php?title=X86_Disassembly/Functions_and_Stack_Frames&oldid=840982> on Apr. 13, 2014, Apr. 23, 2007, 5 pages.
Magnusson, "Understanding stacks and registers in the Sparc architecture(s)", Retrieved from <http://web.archive.org/web/20071020054930/http://www.sics.se/~psm/sparcstack.html> on Apr. 15, 2014, Mar. 1997, 9 pages.
"Corrected Notice of Allowance", U.S. Appl. No. 13/604,407, Jun. 3, 2015, 2 pages.
"Non-Final Office Action", U.S. Appl. No. 13/013,274, Dec. 24, 2015, 16 pages.
"Notice of Allowance", U.S. Appl. No. 12/254,506, Feb. 1, 2016, 7 pages.
"Coding Laboratory—I2C on an AVR using bit banging", Retrieved from <http://codinglab.blogspot.com/2008/10/i2c-on-avr-using-bit-banging.html> on Sep. 22, 2014, Oct. 14, 2008, 5 pages.
"Final Office Action", U.S. Appl. No. 12/254,506, Oct. 9, 2014, 6 pages.
"Non-Final Office Action", U.S. Appl. No. 13/013,274, Sep. 19, 2014, 20 pages.
"Corrected Notice of Allowance", U.S. Appl. No. 12/254,506, Apr. 11, 2016, 2 pages.
"Final Office Action", U.S. Appl. No. 13/013,274, May 25, 2016, 19 pages.

* cited by examiner

DYNAMIC PROCESSOR CORE SWITCHING

RELATED APPLICATION

This application claims priority to U.S. Provisional Patent Application Ser. No. 61/022,435 filed Jan. 21, 2008, entitled "A Faster Method to Dynamically Switch Cores in a Multi Core System" to Sakarda et al., the disclosure of which is incorporated by reference herein in its entirety.

BACKGROUND

System-on-chip (SoC) integrated circuits are being utilized in smaller and/or increasingly complex consumer electronic devices, such as cell phones, media players, digital cameras, network equipment, television client devices, and the like. Typically, all or most of the electronic circuitry, one or more microprocessors, memory, input-output logic control, communication interfaces and components, and other hardware, firmware, and/or software needed to run an entire device can be integrated within an SoC. As the electronic devices are designed to be smaller and more complex, conserving device power continues to be a design initiative, particularly when the devices are smaller and have limited battery or power cell space.

An SoC designed for an electronic device can be implemented with a multi-core processor that includes two or more independent processing cores in a single integrated circuit. A multi-core processor can function to multiprocess computer instructions, such as operating system instructions and device specific application instructions, and may be implemented for simultaneous processing of multiple tasks. While multi-core processors increase processor performance in various consumer electronic devices, power consumption likewise increases.

SUMMARY

This summary introduces concepts of dynamic processor core switching, and the concepts are further described below in the Detailed Description. Accordingly, the summary should not be considered to identify essential features nor used to limit the scope of the claimed subject matter.

In embodiments of dynamic processor core switching, a multi-core processor system includes a first processor core that can execute computer instructions at a first processing rate, and includes at least a second processor core that can execute the computer instructions at a second processing rate that is different than the first processing rate. A core-switch manager can switch execution of the computer instructions from the first processor core to the second processor core while the computer instructions are being executed by the first processor core. A core profiler can generate system profile data that is evaluated to determine when the core-switch manager initiates switching execution of the computer instructions from the first processor core to the second processor core.

In other embodiments, a method is implemented to execute operating system instructions at a first processing rate on a first processor core of a multi-core processor system that includes at least a second processor core to execute the operating system instructions at a second processing rate that is different than the first processing rate. The method is further implemented to monitor processing performance of the multi-core processor system to generate system profile data; evaluate the system profile data to determine when to switch execution of the operating system instructions from the first processor core to the second processor core; and switch execution of the operating system instructions from the first processor core to the second processor core while the operating system instructions are being executed by the first processor core.

In other embodiments, a system-on-chip (SoC) includes a first processor core that can execute computer instructions at a first processing rate, and includes at least a second processor core that can execute the computer instructions at a second processing rate that is different than the first processing rate. A core-switch manager can switch execution of the computer instructions from the first processor core to the second processor core while the computer instructions are being executed. A core profiler can generate system profile data that is evaluated to determine when the core-switch manager initiates switching execution of the computer instructions from the first processor core to the second processor core.

BRIEF DESCRIPTION OF THE DRAWINGS

Embodiments of dynamic processor core switching are described with reference to the following drawings. The same numbers are used throughout the drawings to reference like features and components.

DETAILED DESCRIPTION

Embodiments of dynamic processor core switching provide that computer instructions, such as operating system instructions, can be dynamically switched from one processor core to another in a multi-core processor system during execution of a process. For example, the execution of computer instructions can be switched from a faster processor core to a slower processor core if performance needs can be met, and if the processing load of the computer instructions can be executed on the slower processor. System power may then be conserved when the computer instructions are executed on the slower processing core. Alternatively, the execution of computer instructions can be dynamically switched from a slower processor core to a faster processor core in the multi-core processor system to optimize processing performance based on the processing load. Processor cores in a multi-core processor system can be implemented with different performance and/or power characteristics, and embodiments of dynamic processor core switching can be implemented to dynamically switch the processor cores.

While features and concepts of the described systems and methods for dynamic processor core switching can be implemented in any number of different environments, systems, networks, and/or various configurations, embodiments of dynamic processor core switching are described in the context of the following example environments.

Figure 1:
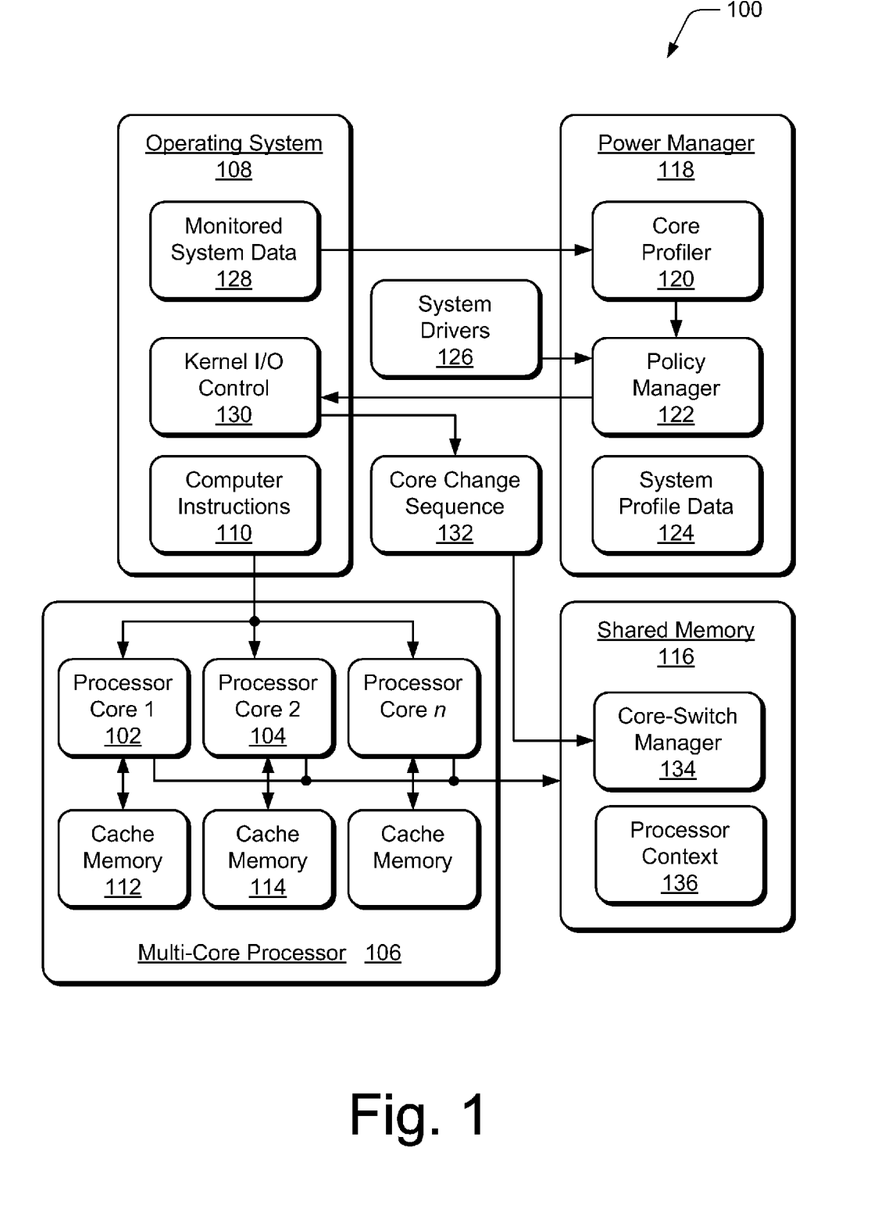
FIG. 1 illustrates an example multi-core processor system in which embodiments of dynamic processor core switching can be implemented.

FIG. 1 illustrates an example multi-core processor system 100 in which embodiments of dynamic processor core switching can be implemented. Example system 100 can include multiple processor cores 1, 2, . . . n, such as a first processor core 102, a second processor core 104, and processor core n of a multi-core processor 106. Although this example multi-core processor 106 is described in examples as including two processor cores, a multi-core processor in practice can be implemented to include two or more independent processing cores. Example system 100 also includes an operating system 108 that has executable computer instructions 110, such as operating system instructions and/or device specific application instructions. Logically, one processor core of the multi-core processor 106 is visible to the operating system 108 at a given time to process the computer instructions 110.

Processor cores in a multi-core processor system can be implemented with different performance and/or power characteristics. Processor core 102 can be implemented to execute the computer instructions 110 at a first processing rate, and processor core 104 can be implemented to execute the computer instructions 110 at a second processing rate that is different than the first processing rate. For example, processor core 102 may be implemented to process computer instructions 110 at a processing rate from 100 MHz to 800 MHz, and processor core 104 may be implemented to process computer instructions 110 at a slower processing rate from 30 MHz to 100 MHz. System power may be conserved when the computer instructions 110 are executed at the slower processing rate on processor core 104. In an implementation, the computer instructions 110 of operating system 108 are executed on one of the processor cores at a time, and the computer instructions 110 can be switched for execution on either processor core 102 or on processor core 104.

Each processor core can have an associated instruction cache and cache memory (also referred to as L1 cache memory), such as cache memory 112 that is associated with processor core 102 and cache memory 114 that is associated with processor core 104. A shared memory 116 (also referred to as L2 cache memory in a multi-core processor system) is accessible to both processor core 102 and processor core 104.

The example multi-core processor system 100 also implements a power manager 118 that includes a core profiler 120 and a policy manager 122, each of which can be implemented as computer-executable instructions and executed by processors to implement various embodiments and/or features of dynamic processor core switching. The power manager 118 can determine when to switch processor cores to execute the computer instructions 110 based on performance needs and the processing load. For example, if a device is being utilized to render audio, such as when processing music in an MP3 digital audio format, the processing load may only be 50 Mhz. The computer instructions to process the music can be executed on processor core 104 that, in the above example, has a processing rate from 30 MHz to 100 Mhz. Alternatively, if a device is being utilized to render video for display and viewing, the processing load may be 400 Mhz. The computer instructions to process the video can be executed on processor core 102 that, in the above example, has a processing rate from 100 MHz to 800 Mhz.

The core profiler 120 can be implemented to monitor the performance of the multi-core processor system 100 and generate system profile data 124 that is evaluated to determine when to initiate switching execution of the computer instructions 110 from one processor core to another. The core profiler 120 can receive monitored system data 128 from the operating system 108, such as current processing performance requirements for a processing load, a data cache miss rate, computer instructions per cycle, active processes, a number of tasks that are currently processing, and other monitored system data. In an implementation, the core profiler 120 can receive an input (e.g., $Core_t$) from a performance profiler of the operating system 108 that indicates a current state of the processor cores. The core profiler 120 can also receive an input (e.g., $Core_{t+1}$) from a task profiler of the operating system 108 that indicates a predictive state of the processor cores.

The power manager 118 and/or the core profiler 120 can be implemented to monitor and implement a system performance and power policy for a multi-core processor system. For example, a multi-core processor can include three processor cores, such as two processor cores that have a faster processing rate and a third processor core that has a slower processor rate. The system performance and power can be tuned for processing load optimization, and to conserve system power. The following table illustrates an example of a system performance and power policy for a multi-core processor system that can be implemented by the power manager 118.

| | | | | Performance Policy | | |
| --- | --- | --- | --- | --- | --- | --- |
| IPC | DMIPS | Memory Statistics | State of System | Processor Core 1 | Processor Core 2 | Processor Core 3 |
| IPC < 0.5 | 0-500 | Data Cache Misses > 10% | Memory Bound | Disabled | Disabled | Enabled |
| IPC < 0.5 | 500-1000 | Data Cache Misses > 10% | Memory Bound | Enabled | Disabled | Disabled |
| IPC > 0.5 | 500-1000 | Data Cache Misses < 10% | CPU Bound | Enabled | Disabled | Disabled |
| IPC > 1.0 | 1000-2000 | Data Cache Misses > 10% | Memory and CPU Bound | Enabled | Enabled | Disabled |
| IPC < 0.5 | 0-500 | Data Cache Misses < 10% | Low MIPS Active and Idle | Disabled | Disabled | Enabled |

The system performance and power policy includes an indication of the performance needed to execute a process in DMIPS (Dhrystone millions of instructions per second), and a state of the system as performance characterizations. A memory bound workload indicates a need to increase the throughput to transfer data between memory or devices at a faster rate, and a CPU bound workload indicates a need to execute computer instructions at a faster processing rate.

The policy manager 122 can be implemented to receive the system profile data 124 from the core profiler 120, as well as data and/or inputs from various system drivers 126, and then determine when to initiate switching execution of the computer instructions 110 from one processor core to another. The policy manager 122 can be implemented to initiate a kernel level operating system call to a kernel input-output control 130 that initiates a core change sequence 132. The core change sequence 132 instructs a core-switch manager 134 to dynamically switch execution of the computer instructions 110 from one processor core to another.

The core-switch manager 134 (also referred to as a hypervisor) can be implemented as computer-executable instructions and executed by processors to implement various embodiments and/or features of dynamic processor core switching. The core-switch manager 134 is embedded in the shared memory 116 and is accessible to both processor core 102 and processor core 104. In an implementation, the core-switch manager 134 can receive an input call from the core change sequence 132 and then determine whether the input call is for security or to initiate core switching because the core-switch manager 134 can also be implemented for security. In embodiments, the core-switch manager 134 is implemented to switch execution of the computer instructions from one processor core to another while the computer instructions are being executed (e.g., dynamically switch execution of the computer instructions from one processor core to another processor core during execution of a process).

In an example embodiment of dynamic processor core switching, the core change sequence 132 instructs the core-switch manager 134 to switch execution of the computer instructions 110 from processor core 102 to processor core 104. The core-switch manager 134 initiates to complete pending read and write instructions at processor core 102; disable interrupts for processor core 102; write a processor context state 136 of processor core 102 to the shared memory 116; communicate a processor core timer event as an inter process communication to processor core 104 to signal a processor core switch; clear the timer event if processor core 104 acknowledges the processor core timer event; read the processor context state 136 of processor core 102 from the shared memory 116; configure registers of processor core 104 based on the processor context state 136; and execute (or continue executing) the computer instructions 110 on processor core 104.

In an embodiment, the core-switch manager 134 can also be implemented to flush and invalidate the cache memory 112 that is associated with processor core 102 after execution of the computer instructions 110 is switched to processor core 104. Clearing the cache memory (e.g., L1 cache flushes) after a dynamic core switch from one processor core to another improves dynamic processor core switching times.

Figure 2:
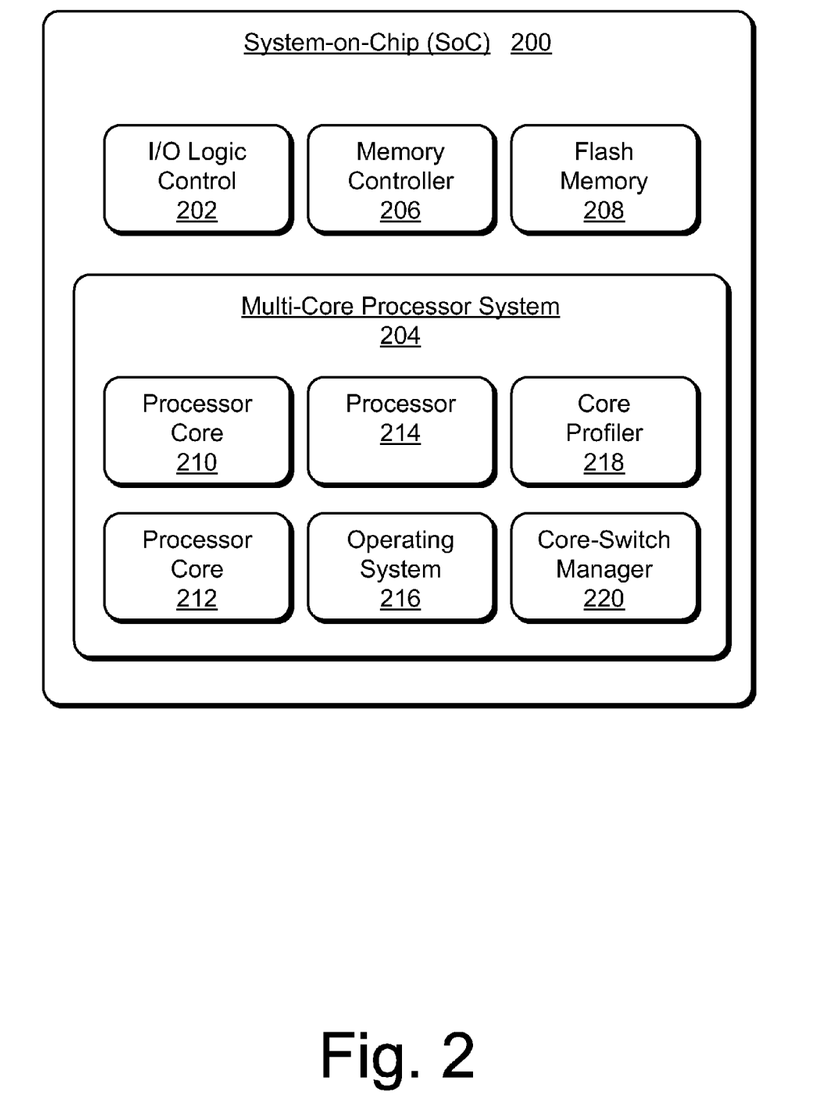
FIG. 2 illustrates an example system-on-chip (SoC) environment in which embodiments of dynamic processor core switching can be implemented.

FIG. 2 illustrates an example system-on-chip (SoC) 200 which can implement various embodiments of dynamic processor core switching in any type of a consumer electronic device. An SoC can be implemented in a fixed or mobile device, such as any one or combination of a media device, computer device, television set-top box, video processing and/or rendering device, appliance device, gaming device, electronic device, vehicle, workstation, and/or in any other type of device that may include a multi-core processor system.

The SoC 200 can be integrated with electronic circuitry, a microprocessor, memory, input-output (I/O) logic control, communication interfaces and components, other hardware, firmware, and/or software needed to run an entire device. The SoC 200 can also include an integrated data bus that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 200 can also be implemented with any number and combination of differing components as further described with reference to the example device shown in FIG. 5.

In this example, SoC 200 includes various components such as an input-output (I/O) logic control 202 (e.g., to include electronic circuitry, generally) and a multi-core processor system 204. The SoC 200 also includes a memory controller 206 and flash memory 208 which can be any type of random access memory (RAM), a low-latency nonvolatile memory, read only memory (ROM), and/or other suitable electronic data storage.

The multi-core processor system 204 includes a first processor core 210 and a second processor core 212 of a multi-core processor 214 (e.g., any of a microcontroller, digital signal processor, etc.). The multi-core processor system 204 can also include various firmware and/or software (e.g., executable computer instructions, operating system instructions, and/or application instructions), such as an operating system 216, core profiler 218, and a core-switch manager 220. The operating system 216, core profiler 218, and core-switch manager 220 can each be implemented as computer-executable instructions maintained by memory 208 and executed by processor 214. The SoC 200 can also include other various communication interfaces and components, wireless LAN (WLAN) components, and other hardware, firmware, and/or software.

The multi-core processor system 204 in SoC 200 is an example of the multi-core processor system 100 described with reference to FIG. 1. Examples of the various components, functions, and/or modules, as well as corresponding functionality and features, are described with reference to the respective components of example system 100 shown in FIG. 1. Alternatively or in addition, components of the multi-core processor system 204 can be implemented as hardware, firmware, fixed logic circuitry, or any combination thereof that is implemented in connection with the I/O logic control 202 and/or other processing and control circuits of SoC 200.

Example methods 300 and 400 are described with reference to respective FIGS. 3 and 4 in accordance with one or more embodiments of dynamic processor core switching. Generally, any of the functions, methods, procedures, components, and modules described herein can be implemented using hardware (e.g., fixed logic circuitry), software, firmware, manual processing, or any combination thereof. A software implementation of a function, method, procedure, component, or module represents program code that performs specified tasks when executed on a computing-based processor. The example method(s) may be described in the general context of computer-executable instructions, which can include software, applications, routines, programs, objects, components, data structures, procedures, modules, functions, and the like.

Figure 3:
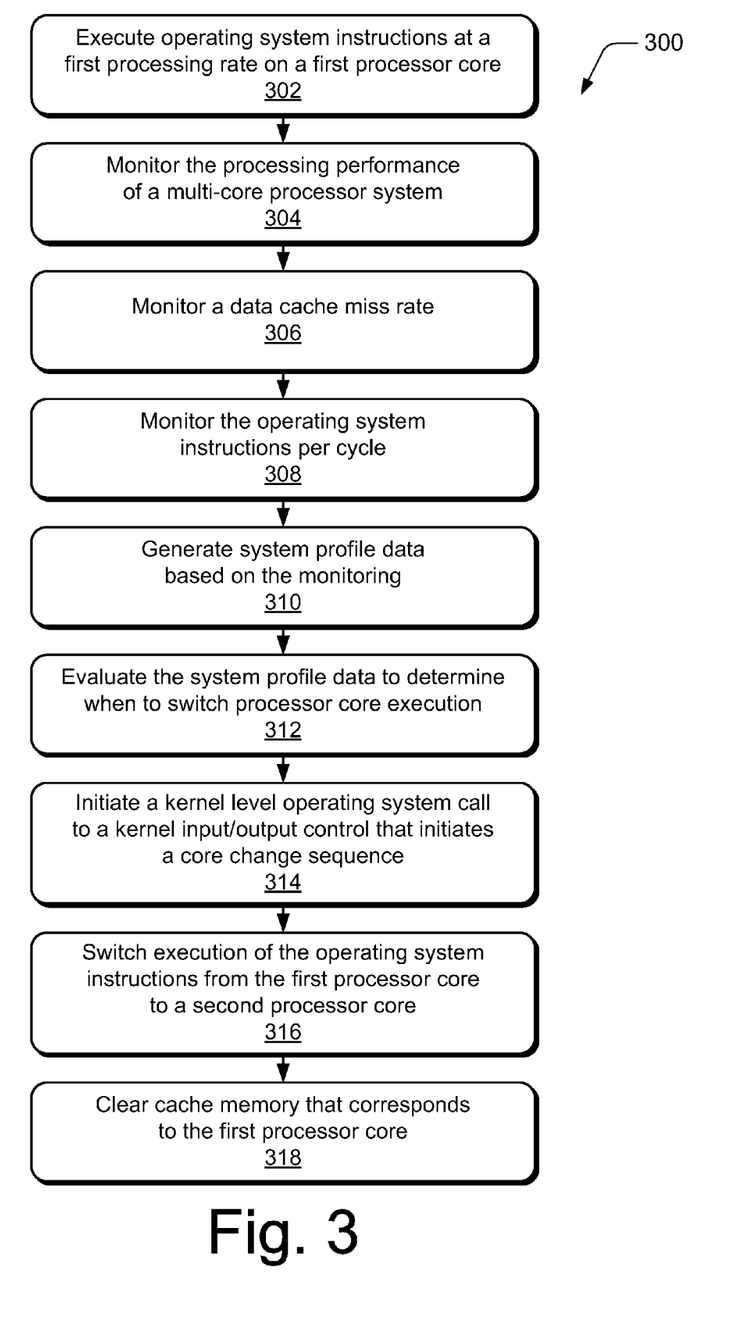
FIG. 3 illustrates example method(s) of dynamic processor core switching in accordance with one or more embodiments.

FIG. 3 illustrates example method(s) 300 of dynamic processor core switching. The order in which the method is described is not intended to be construed as a limitation, and any number of the described method blocks can be combined in any order to implement the method, or an alternate method.

At block 302, operating system instructions are executed at a first processing rate on a first processor core. For example, multi-core processor 106 (FIG. 1) includes the first processor core 102 that executes operating system instructions (e.g., computer instructions 110) at a first processing rate. The multi-core processor 106 includes at least the second processor core 104 that executes the operating system instructions at a second processing rate that is different than the first processing rate. In an embodiment, the first processing rate of the first processor core 102 is a faster processing rate than the second processing rate of the second processor core 104.

At block 304, processing performance of the multi-core processor system is monitored; at block 306, a data cache miss rate is monitored; and at block 308, the operating system instructions per cycle are monitored. For example, core profiler 120 receives monitored system data 128 from the operating system 108 and monitors the processing performance of the multi-core processor 106, such as current processing performance requirements for a processing load, a data cache miss rate, computer instructions per cycle, active processes, a number of tasks that are currently processing, and other monitored system data.

At block 310, system profile data is generated based on the monitoring. For example, core profiler 120 generates system profile data 124 that is evaluated to determine when to initiate switching execution of the computer instructions 110 from processor core 102 to processor core 104. At block 312, the system profile data is evaluated to determine when to switch execution of the operating system instructions from the first processor core to the second processor core. For example, policy manager 122 receives the system profile data 124 from the core profiler 120, as well as data and/or inputs from various system drivers 126, and determines when to initiate switching execution of the computer instructions 110 from processor core 102 to processor core 104.

At block 314, a kernel level operating system call is initiated to a kernel input-output control that initiates a core change sequence to switch execution of the operating system instructions from the first processor core to the second processor core. For example, policy manager 122 initiates a kernel level operating system call to the kernel input-output control 130 that initiates a core change sequence 132 which instructs the core-switch manager 134 to dynamically switch execution of the computer instructions 110 from processor core 102 to processor core 104. An embodiment of the core change sequence is described with reference to FIG. 4.

At block 316, execution of the operating system instructions is switched from the first processor core to the second processor core while the operating system instructions are being executed by the first processor core. For example, execution of the computer instructions 110 is dynamically switched from processor core 102 to processor core 104 during execution of a process by processor core 102. At block 318, cache memory that corresponds to the first processor core is cleared after switching execution of the operating system instructions from the first processor core to the second processor core. For example, core-switch manager 134 flushes and invalidates cache memory 112 that is associated with processor core 102 after execution of the computer instructions 110 is switched to processor core 104.

Figure 4:
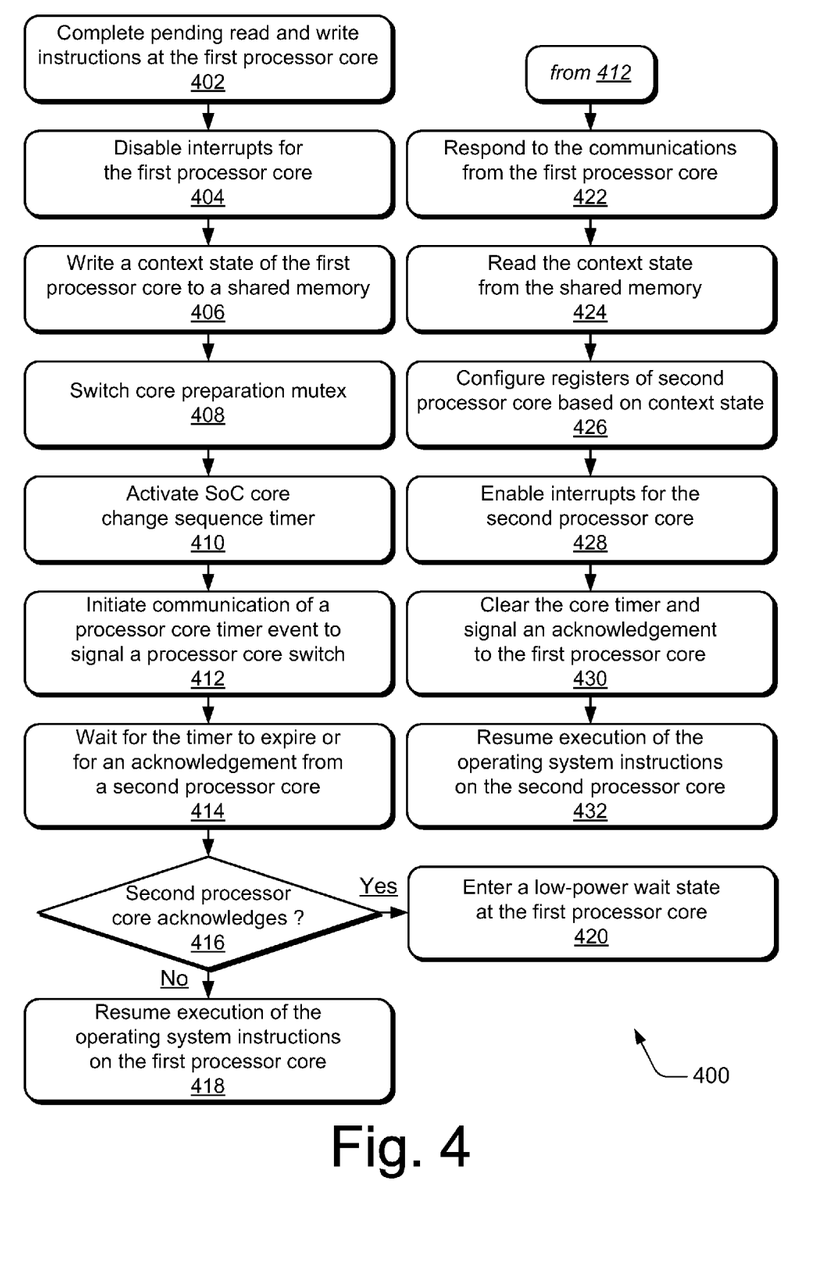
FIG. 4 illustrates example method(s) of dynamic processor core switching in accordance with one or more embodiments.

FIG. 4 illustrates example method(s) 400 of dynamic processor core switching, and is directed to the core change sequence 132 that instructs the core-switch manager 134 to switch execution of the computer instructions 110 from processor core 102 to processor core 104. The order in which the method is described is not intended to be construed as a limitation, and any number of the described method blocks can be combined in any order to implement the method, or an alternate method. In an embodiment, method blocks 402 through 420 occur on the first processor core 102, and method blocks 422 through 432 occur on the second processor core 104.

At block 402, pending read and write instructions are completed at the first processor core. For example, core-switch manager 134 (FIG. 1) initiates to complete pending read and write instructions at processor core 102. At block 404, interrupts for the first processor core are disabled and at block 406, a context state of the first processor core is written to a shared memory. For example, the interrupts for processor core 102 are disabled and a processor context state 136 of processor core 102 is written to the shared memory 116.

At block 408, core preparation mutex is switched and, at block 410, an SoC core change sequence timer is activated. At block 412, a processor core timer event is communicated to the second processor core to signal a processor core switch. For example, a processor core timer event is communicated as an inter process communication to processor core 104 to signal a processor core switch. At block 414, the first processor core waits for either the timer to expire or for an acknowledgement from the second processor core. Approximately simultaneously, the second processor core 104 begins execution at block 422 (described below).

At block 416, a determination is made as to whether the second processor core acknowledges the processor core timer event. If processor core 104 does not acknowledge success of the core switching event (i.e., "no" from block 416), then at block 418, execution of the operating system instructions is resumed on the first processor core. For example, execution of the computer instructions 110 continues on processor core 102. If processor core 104 does acknowledge success of the core switching event (i.e., "yes" from block 416), then at block 420, the first processor core enters a low-power wait state.

At block 422, the second processor core responds to the communications from the first processor core (i.e., communications initiated at blocks 408 and 412). At block 424, the context state of the first processor core is read from the shared memory and, at block 426, registers of the second processor core are configured based on the context state. For example, the processor context state 136 of processor core 102 is read from shared memory 116 and registers of processor core 104 are configured based on the processor context state 136.

At block 428, interrupts for the second processor core are enabled. At block 430, the second processor core clears the core timer and signals an acknowledgement to the first processor core. At block 432, execution of the operating system instructions resumes on the second processor core. For example, execution of the computer instructions 110 is continued on processor core 104.

Figure 5:
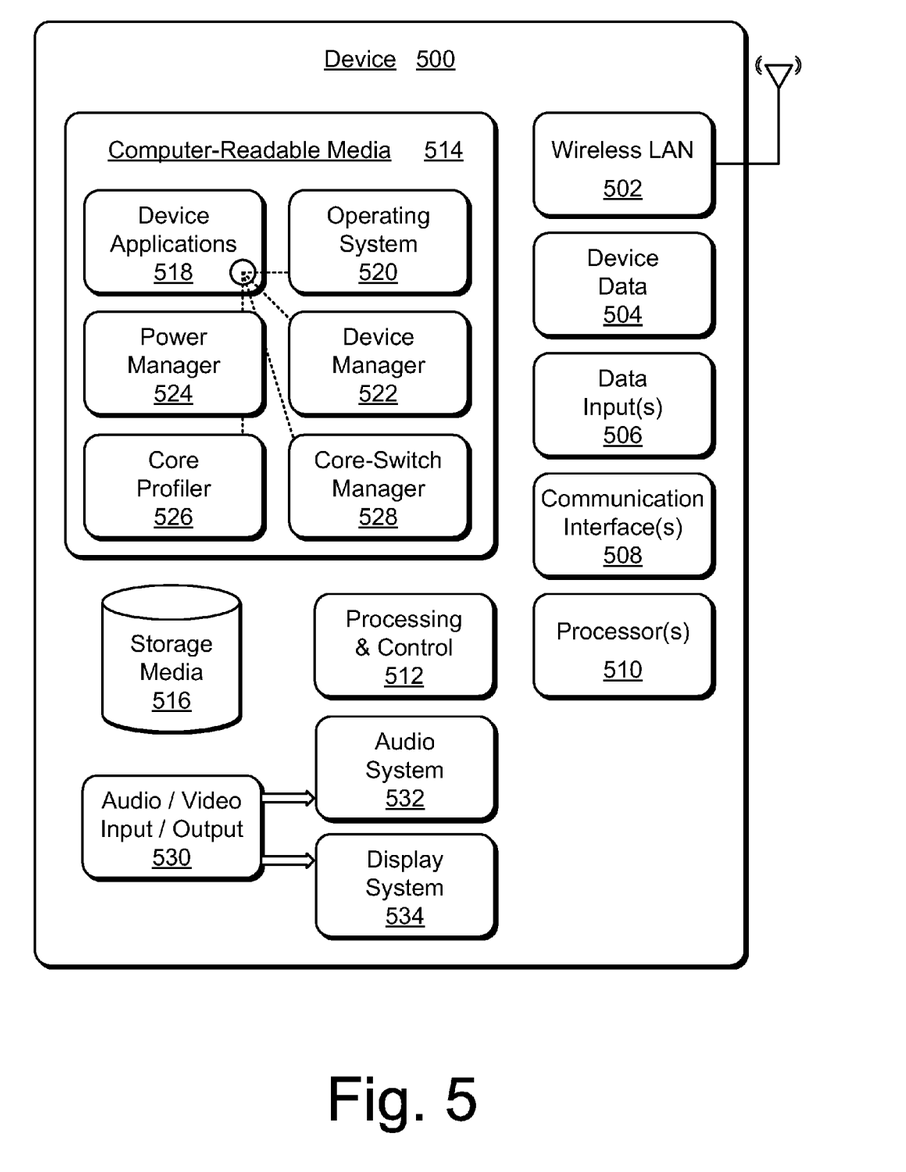
FIG. 5 illustrates various components of an example device that can implement embodiments of dynamic processor core switching.

FIG. 5 illustrates various components of an example device 500 that can be implemented as any type of device that includes a multi-core processor system and/or implements various embodiments of dynamic processor core switching. For example, device 500 can be implemented to include example multi-core processor system 100 shown in FIG. 1 and/or can include the system-on-chip (SoC) 200 shown in FIG. 2. In embodiment(s), device 500 can be implemented as any one or combination of a wired and/or wireless device, media device, computer device, communication device, television set-top box, video processing and/or rendering device, appliance device, gaming device, electronic device, vehicle, workstation, access point, and/or as any other type of device. Device 500 may also be associated with a user (i.e., a person) and/or an entity that operates the device such that a device describes logical devices that include users, software, firmware, and/or a combination of devices.

Device 500 includes wireless LAN (WLAN) components 502, that enable wireless communication of device data 504 (e.g., received data, data that is being received, data scheduled for broadcast, data packets of the data, etc.). The device data 504 or other device content can include configuration settings of the device and/or information associated with a user of the device. Device 500 can also include one or more data inputs 506 via which any type of data, media content, and/or inputs can be received, such as user-selectable inputs and any other type of audio, video, and/or image data.

Device 500 can also include communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices can communicate data with device 500.

Device 500 can include one or more processors 510 (e.g., any of microprocessors, controllers, and the like) which process various computer-executable instructions to control the operation of device 500, to communicate with other electronic and computing devices, and to implement embodiments of dynamic processor core switching. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 can also include computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager 522 (e.g., a control application, software application, signal processing and control module, code that is native to a particular device, a hardware abstraction layer for a particular device, etc.). The device applications 518 can also include a power manager 524, a core profiler 526, and/or a core-switch manager 528 when device 500 implements various embodiments of dynamic processor core switching. In this example, the device applications 518 are shown as software modules and/or computer applications.

Device 500 can also include an audio and/or video input-output system 530 that provides audio data to an audio system 532 and/or provides video data to a display system 534. The audio system 532 and/or the display system 534 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, audio system 532 and/or the display system 534 can be implemented as external components to device 500. Alternatively, the audio system 532 and/or the display system 534 can be implemented as integrated components of example device 500.

Although embodiments of dynamic processor core switching have been described in language specific to features and/or methods, it is to be understood that the subject of the appended claims is not necessarily limited to the specific features or methods described. For example, one or more method blocks of the methods described above can be performed in a different order (or concurrently) and still achieve desirable results. Moreover, the specific features and methods are disclosed as example implementations of dynamic processor core switching.

The invention claimed is:

1. A multi-core processor system, comprising:
 a first processor core configured to process computer instructions at a first rate;
 a cache memory corresponding to the first processor core;
 a second processor core configured to process the computer instructions at a second rate that is different than the first rate;
 a first shared memory accessible by the first processor core and the second processor core;
 a core-switch manager configured to switch execution of the computer instructions from the first processor core to the second processor core while the computer instructions are being executed by the first processor core, the switching comprising:
  causing the first processor core to activate a processor core timer event;
  causing the second processor core to read a context state of the first processor core from the first shared memory; and
  responsive to receiving a signal from the second processor core to clear the processor core timer event, initiate flushing of the cache memory corresponding to the first processor core and begin execution of the computer instructions on the second core; or
  responsive to the processor core timer event lapsing without receiving the signal from the second processor core to clear the processor core timer event, causing the first processor core to resume execution of the computer instructions; and a core profiler configured to generate system profile data to determine when the core-switch manager initiates the switching of the execution of the computer instructions from the first processor core to the second processor core.

2. A multi-core processor system as recited in claim 1, wherein the core profiler is further configured to monitor processing performance, a data cache miss rate, and the computer instructions per cycle to generate the system profile data.

3. A multi-core processor system as recited in claim 1, wherein the execution of the computer instructions comprises an execution of a process.

4. A multi-core processor system as recited in claim 1, wherein the computer instructions are operating system instructions configured to execute on one of the first processor core or the second processor core.

5. A multi-core processor system as recited in claim 1, further comprising a second shared memory storing processor-executable code, the second shared memory being a read-only memory (ROM) that is accessible by the first processor core and the second processor core, and wherein the core switch manager is implemented, at least in part, by the first processor core and the second processor core each executing at least some of the processor-executable code from the second shared memory.

6. A multi-core processor system as recited in claim 1, wherein the first rate at which the first processor core processes the computer instructions is faster than the second rate at which the second processor core processes the computer instructions, and wherein system power is conserved after the execution of the computer instructions is switched from the first processor core to the second processor core.

7. A multi-core processor system as recited in claim 1, wherein the core profiler is further configured to receive an indication of a predictive state of the processor cores, and wherein the predictive state of the processor cores is also evaluated to determine when the core-switch manager initiates the switching of the execution of the computer instructions from the first processor core to the second processor core.

8. A multi-core processor system as recited in claim 1, further comprising a policy manager configured to receive the system profile data from the core profiler and evaluate the system profile data to determine when to cause the core-switch manager to switch execution of the computer instructions from the first processor core to the second processor core.

9. A multi-core processor system as recited in claim 8, wherein the policy manager is further configured to initiate a kernel level operating system call to a kernel input-output control that initiates a core change sequence that instructs the core-switch manager to switch the execution of the computer instructions from the first processor core to the second processor core.

10. A multi-core processor system as recited in claim 9, wherein the core change sequence instructs the core-switch manager to initiate:
a completion of pending read and write instructions;
a disabling of interrupts for the first processor core;
a writing of the context state of the first processor core to the first shared memory;
a communication of the processor core timer event to the second processor core to signal a processor core switch;
the clearing of the processor core timer event if the second processor core acknowledges the processor core timer event; and
a configuring of one or more registers of the second processor core based on the context state.

11. A method, comprising:
processing computer instructions, the computer instructions including operating system instructions, at a first rate on a first processor core of a multi-core processor system that includes a second processor core configured to process the computer instructions at a second rate that is different than the first rate;
monitoring processing performance of the multi-core processor system to generate system profile data;
evaluating the system profile data to determine when to switch execution of the computer instructions from the first processor core to the second processor core;
causing execution of the computer instructions on the first processor core; and
causing a core-switch manager to switch execution of the computer instructions from the first processor core to the second processor core, the switching comprising:
activating a processor core timer event; and
responsive to the second processor core clearing the processor core timer event, initiating flushing of cache memory that corresponds to the first processor core and causing execution of the computer instructions on the second processor core; or
responsive to the second processor core not clearing the processor core timer event, initiating a processor core timer event timeout, the processor core timer event timeout causing execution of the computer instructions to resume on the first processor core.

12. A method as recited in claim 11, further comprising monitoring a data cache miss rate and the computer instructions per cycle to further generate the system profile data.

13. A method as recited in claim 11, wherein the execution of the computer instructions comprises an execution of a process.

14. A method as recited in claim 11, wherein the first rate of the first processor core is faster than the second rate of the second processor core and said switch of execution of the computer instructions is effective to conserve system power.

15. A method as recited in claim 11, further comprising receiving, from an operating system task profiler, an indication of predictive states of the first processor core and the second processor core and wherein the method further comprises evaluating the indication of predictive states to determine when to switch execution of the computer instructions from the first processor core to the second processor core.

16. A method as recited in claim 11, wherein causing the core-switch manager to switch comprises initiating a kernel level operating system call to a kernel input-output control that initiates a core change sequence to switch execution of the operating system instructions from the first processor core to the second processor core.

17. A method as recited in claim 11, further comprising causing the core-switch manager to perform operations comprising:
completing pending read and write instructions at the first processor core;
disabling interrupts for the first processor core;
writing a context state of the first processor core to a shared memory;
communicating the processor core timer event to the second processor core to signal a processor core switch;

clearing the processor core timer event if the second processor core acknowledges the processor core timer event;

reading the context state of the first processor core from the shared memory; and configuring one or more registers of the second processor core based on the context state.

18. A system-on-chip (SoC), comprising:

a communication interface configured to provide a communication link between a device including the SoC and a data communication network;

a memory controller operably coupled with flash memory; and a multi-core processor system operably coupled to the communication interface and the memory controller by an integrated data bus, the multi-core processor system comprising:

a first processor core configured to process computer instructions at a first rate;

a second processor core configured to process the computer instructions at a second rate that is different than the first rate;

a cache memory corresponding to the first processor core;

a core-switch manager configured to switch execution of the computer instructions from the first processor core to the second processor core while the computer instructions are being executed, the switching comprising:

executing the computer instructions on the first processor core;

activating a processor core switch timer;

loading into the second processor core a context state stored by the first processor core;

clearing the processor core switch timer by the second processor core; and         responsive to the second processor core clearing the processor core switch timer, initiate flushing of the cache memory corresponding to the first processor core and begin execution of the computer instructions on the second processor core; or         responsive to the second processor core not clearing the processor core switch timer, resuming execution of the computer instructions on the first processor core; and     a core profiler configured to generate system profile data to determine when the core-switch manager initiates the switching of the execution of the computer instructions from the first processor core to the second processor core.

19. An SoC as recited in claim 18, wherein the core profiler is further configured to monitor processing performance, a data cache miss rate, and the computer instructions per cycle to generate the system profile data and wherein the system profile data is evaluated to determine whether to switch cores without switching execution of the computer instruction from the first processor core to the second processor core.

20. An SoC as recited in claim 18, wherein the execution of the computer instructions comprises an execution of a process.

21. An SoC as recited in claim 18, wherein the computer instructions are operating system instructions configured to execute on one of the first processor core or the second processor core.

22. An SoC as recited in claim 18, further comprising a shared memory storing processor-executable code, the shared memory being a read-only memory (ROM) that is accessible by the first processor core and the second processor core, and wherein the core-switch manager is implemented, at least in part, by the first processor core and the second processor core executing the processor-executable code from the shared memory.

23. An SoC as recited in claim 18, wherein the first rate at which the first processor core processes the computer instructions is faster than the second rate at which the second processor core processes the computer instructions, and wherein system power is conserved after the execution of the computer instructions is switched from the first processor core to the second processor core.

24. An SoC as recited in claim 18, further comprising a policy manager configured to receive the system profile data from the core profiler and evaluate the system profile data to determine when to cause the core-switch manager to switch execution of the computer instructions from the first processor core to the second processor core.

25. An SoC as recited in claim 24, wherein the policy manager is further configured to initiate a kernel level operating system call to a kernel input-output control that initiates a code change sequence that instructs the core-switch manager to switch execution of the computer instructions from the first processor core to the second processor core.

* * * * *